Oct. 5, 1943.   A. D. A. DEL PESCO   2,331,177
FOOT MEASURING MACHINE
Filed Sept. 23, 1941   4 Sheets-Sheet 1
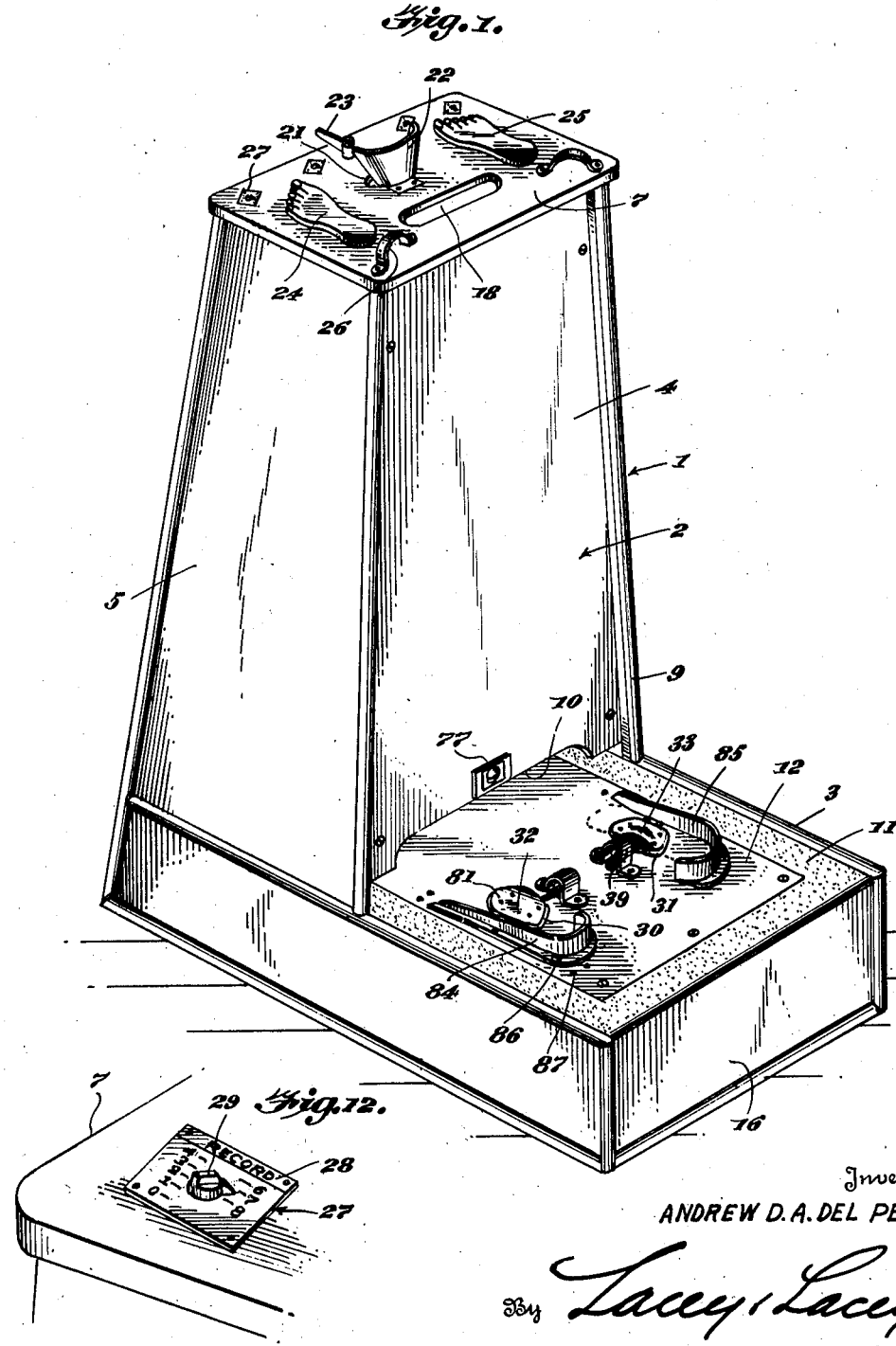
Inventor
ANDREW D. A. DEL PESCO
By Lacey & Lacey,
Attorneys Oct. 5, 1943.  A. D. A. DEL PESCO  2,331,177
FOOT MEASURING MACHINE
Filed Sept. 23, 1941  4 Sheets-Sheet 2
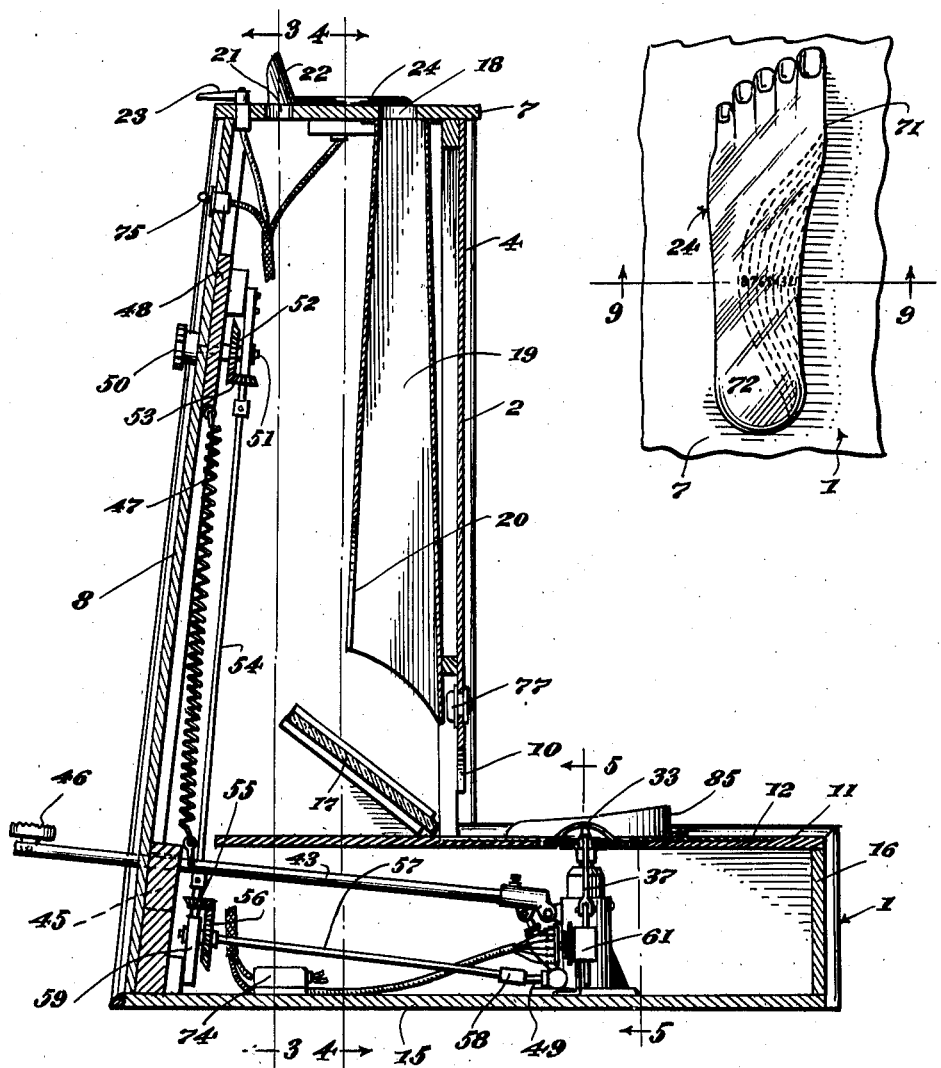
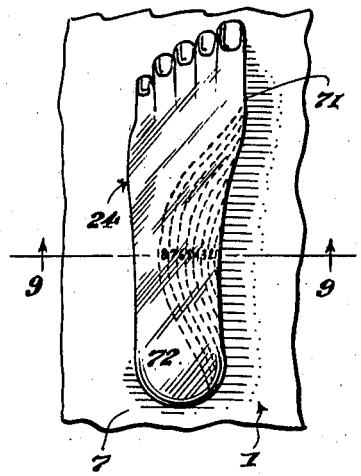
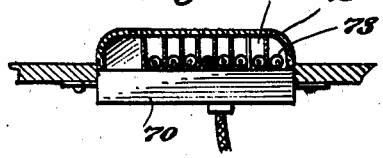
Inventor
ANDREW D.A. DEL PESCO Oct. 5, 1943. A. D. A. DEL PESCO 2,331,177
FOOT MEASURING MACHINE
Filed Sept. 23, 1941 4 Sheets-Sheet 3
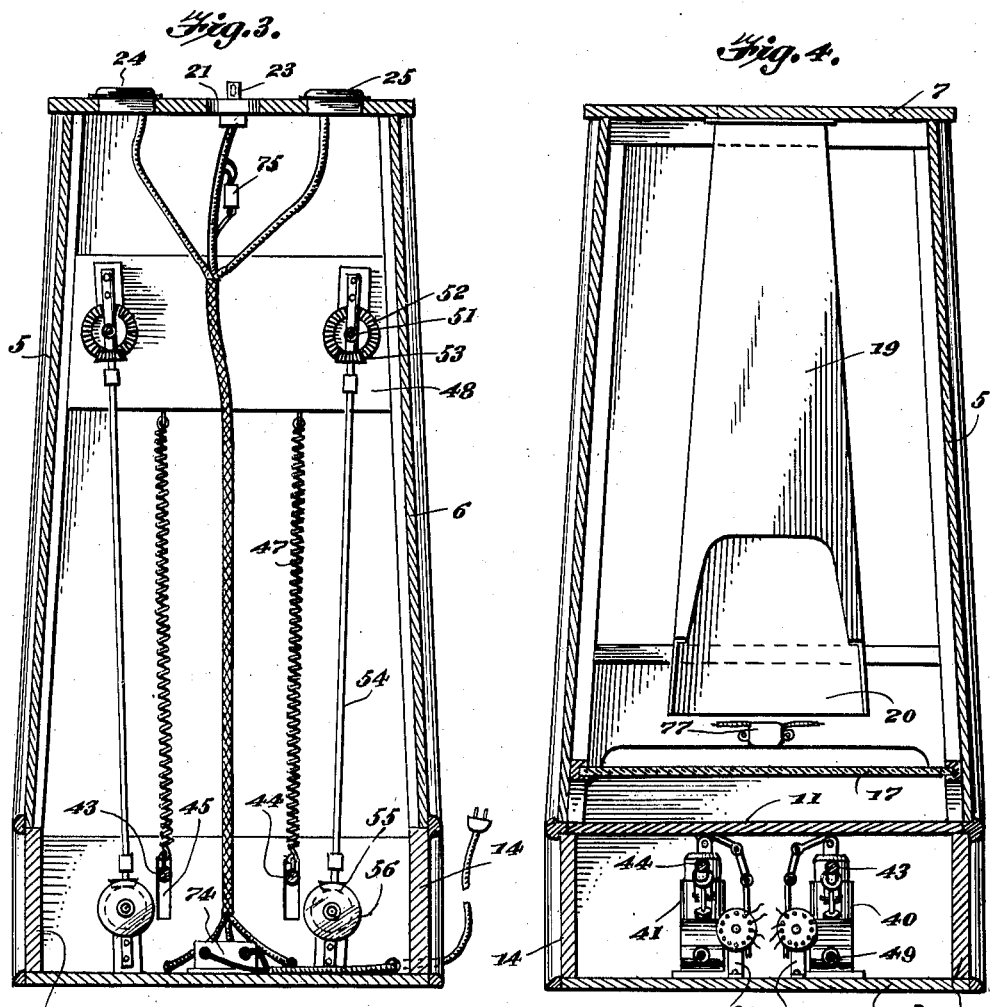
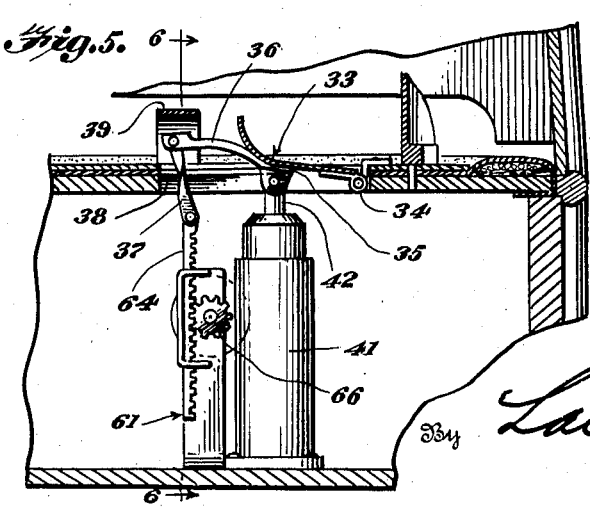
Inventor
ANDREW D. A. DEL PESCO
By Lacey & Lacey,
Attorneys

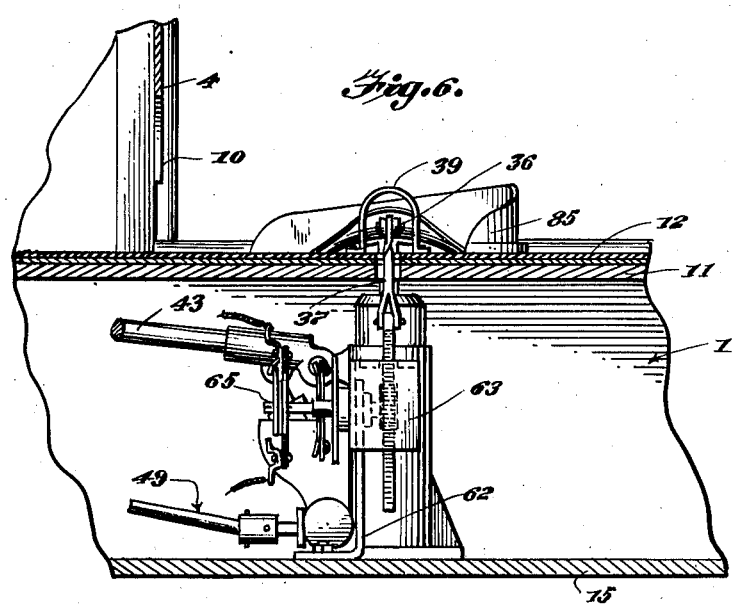
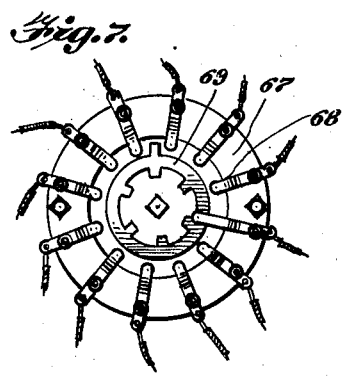
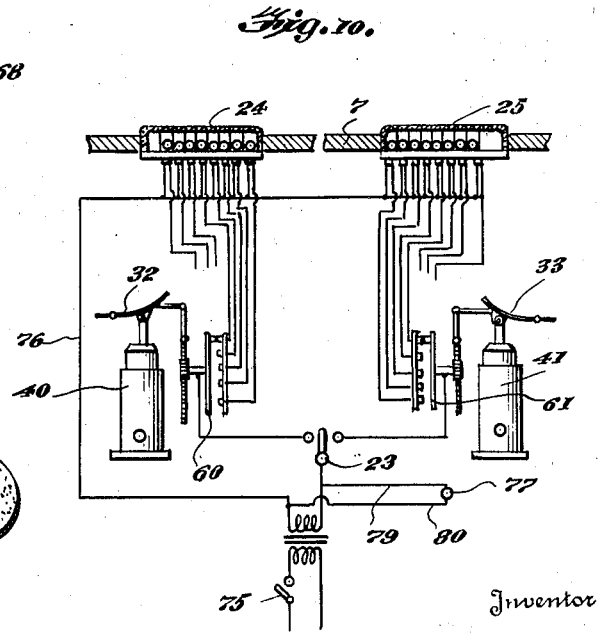
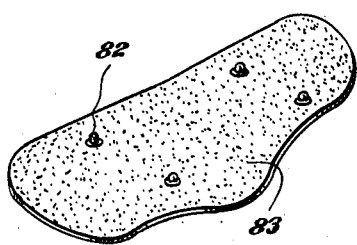

Patented Oct. 5, 1943

2,331,177

UNITED STATES PATENT OFFICE 2,331,177

FOOT MEASURING MACHINE

Andrew D. A. Del Pesco, Danielson, Conn.

Application September 23, 1941, Serial No. 412,027

3 Claims. (Cl. 33—3)

This invention relates generally to measuring and indicating devices and more particularly to an improved foot measuring machine.

One object of the invention is to provide a foot measuring machine by the use of which it will be possible to measure a patient's or customer's feet quickly and accurately so that the proper size and style of shoe may be readily determined.

Another object of the invention is to provide a machine of this character which will be operative for permitting accurate determination, even in fractions or percentages, of arch weaknesses, extension of feet through elongation, amount of adduction or abduction, pronation of heel and ankle, amount of pressure forced at first metatarsal and lower base of fibula, and the inner edge of os calsis.

A further object of the invention is to provide a foot measuring machine wherein the foot plates employed are so mounted that they may be elevated from an inoperative position to various operative positions in a uniform manner so that excessive pressure at any one point on the foot of a patient or customer will be avoided.

A further object of the invention is to provide a foot measuring machine employing means for causing flexing at the medio-tarsal joint while allowing gradual return of the sustantaculum-tali to its natural position, means also being employed for allowing both the operator and the patient or customer to observe the operations, from comfortable positions, during said operation.

Still another object of the invention is to provide a measuring machine of the character mentioned having means for permitting the easy recording of data relating to a particular customer's or patient's feet and obtained during a measuring operation, so that said data may be referred to after the said customer or patient has stepped away from the machine.

And a still further object of the invention is to provide a foot measuring machine wherein adjustable guides and interchangeable foot plate covers are employed to allow for measurement of rigid, flexible, traumatic, weak, flat, tender, injured, hollow, or any other type, size, width or shape of human arch.

Another object of the invention is to provide a foot measuring machine which is attractive in appearance and which is capable of easy operation by an operator from a comfortable position.

Other objects of the invention, not specifically mentioned hereinbefore, will become apparent during the course of the following description.

In the drawings forming a part of my application:

Figure 1 is a perspective view of my improved foot measuring machine,

Figure 2 is a vertical sectional view of the machine,

Figure 3 is a vertical transverse sectional view on the line 3—3 of Figure 2 looking in the direction of the arrows, Figure 4 is a vertical transverse sectional view on the line 4—4 of Figure 2, Figure 5 is an enlarged detail sectional view on the line 5—5 of Figure 2, Figure 6 is an enlarged detail sectional view on the line 6—6 of Figure 5, Figure 7 is an enlarged detail end view showing one of the switches employed, Figure 8 is a detail top plan view, on an enlarged scale, showing one of the indicators employed, Figure 9 is a transverse sectional view on the line 9—9 of Figure 8, Figure 10 is a diagrammatic view showing the wiring diagram employed, Figure 11 is a detail perspective view, enlarged, showing one of the removable insoles to be mounted on one of the foot plates, and Figure 12 is an enlarged detail perspective view showing one of the recording scales.

In the drawings similar numerals of reference will be employed to designate like parts throughout the various views.

The numeral 1 indicates in general the cabinet of my improved foot measuring machine. The cabinet 1 is of substantially L shape, is formed of wood, metal, or other suitable material, and includes a vertical leg or section 2 and a horizontal lower section 3. The vertical section 2 is substantially frusto-pyramidal in shape and includes a front wall 4, side walls 5 and 6 and a top wall 7, said top wall being substantially rectangular in shape. As will be seen in Figure 2, the section 2 includes a rear wall 8 which extends downwardly and also forms a rear wall for the section 3. The side walls and front and rear walls are joined at their meeting ends by beads 9. It should be understood that various modifications in the design of my improved foot measuring machine may be resorted to without departing from the spirit of the invention or the scope of the claims appended to this specification. The front wall 4 terminates short of the lower end of the section 2 and is cut away at 10 to provide a sight opening, the purpose for which will be set forth in more detail hereinafter.

The horizontal section 3 includes a top wall 11 which may be decorated ornamentally if desired. Mounted in the top wall is a preferably metal plate 12, said plate extending throughout the major portion of the central area of the wall 11. As will be seen in Figure 2, the top wall 11 extends inwardly beneath the wall 4 of the section 2 and has its end disposed in spaced relation to the rear wall 8. The section 3 also includes side walls 13 and 14, a bottom wall 15, which defines a base for the entire machine, and a front wall 16.

Mounted on the top wall 11 substantially medially of its length and inwardly of the section 2 is an upwardly inclined mirror 17. Formed in the top wall 7 of the section 2 near the forward edge thereof is an oblong sight opening 18, said sight opening being disposed above the mirror 17. Mounted on the under surface of the wall 7 and surrounding the sight opening 18 is a sight tunnel or tube 19, said tube extending downwardly in the section 2 and terminating in spaced relation above the mirror 17. The sight tube 19 is rectangular in cross section and is gradually enlarged toward its lower end. As shown at 20, the tube has the lower end portion of the rear wall cut away so as to permit full vision of the mirror 17. Formed in the top wall 7 of the section 2 near its rear edge is a relatively small sight opening 21, the purpose for which will be set forth in more detail hereinafter. A shield 22, of metal, partially surrounds the sight opening 21.

Mounted on the top wall 7 of the section 2 between the rear edge thereof and the sight opening 21, and substantially medially of the length of said top wall, is a selector control switch 23. Also mounted on the top wall 7, at each side of the sight openings and between said sight openings and the ends of said top wall, are indicators 24 and 25 which are shaped, respectively, to resemble the left and right human feet. Also mounted on the top wall 7 at the front corners thereof are handles 26, and arranged along the rear margin of said top wall, as best seen in Figure 12, are recorders 27, said recorders each including a plate 28, having a scale thereon, and a rotatable pointer 29. The handles 26 are for manual engagement by a patient or customer who is having his feet measured, said handles permitting the customer to steady himself during the operation. The construction of the indicators 24 and 25 and the purpose of the switch 23 and the recorders 27 will be discussed in more detail hereinafter.

The mechanism for raising the arches of a customer's or patient's feet will now be described. The plate 12 is formed with openings 30 and 31 which are disposed near the opposite side edges of said plate 12. The openings are of oblong shape and alined with similar openings in the wall 11. Hingedly mounted in the openings 30 and 31, respectively, are foot plates 32 and 33, said plates being shaped to conform to the arch of the human foot and having corresponding edge portions swingingly connected with the plate 12 by hinges 34. The foot plates 32 and 33 are identical in their details of construction, the plate 32 being for engagement with the arch of the left foot while the plate 33 being adapted for engagement with the arch of the right foot. A description of the details of construction of one of the plates is thought to suffice for both. The plate 33 includes a depending lug 35 which is disposed near the free edge of said plate and substantially medially of its length. The plate 33 also includes a laterally extending integral lever 36 which is formed at its free end with a yoke for engagement with the upper end of a link 37. The lower end of the link is connected with the upper end of a rack forming a part of a multipoint switch, the construction of which will be described in more detail hereinafter. As will be observed, the link 37 projects through an opening 38 in the plate 12. A guard 39, of substantially inverted U shape formation, straddles the opening 38 and effectively protects the end portion of the lever 36.

Mounted on the bottom wall 15 of the section 3 of the cabinet 1 are lifting jacks 40 and 41, the jack 40 being adapted for use with the foot plate 32 and the jack 41 being operatively connected with the plate 33. Inasmuch as the jacks are of identical construction and are of well known design, it is not deemed necessary to describe them in minute detail. Suffice it to state that the jack 41, which is typical, includes a plunger 42 which has its upper end connected with the lug 35. The jacks 40 and 41 include operating levers 43 and 44, respectively, said levers projecting rearwardly through the section 3 and through the rear wall 8, said wall being slotted, as shown in dotted lines at 45. A treadle 46 is mounted on the outer end of each of the levers for engagement by the foot of the operator for raising the jacks. Springs 47 are connected between the levers 43 and 44, near their mid-portions, and at transversely extending mounting block 48 which is mounted against the inner surface of the wall 8 near its upper end. The springs 47 will, of course, retain the levers 43 and 44 normally in raised inoperative positions. It will now be understood that, when it is desired to raise the foot plate 33, for example, it is only necessary to raise and lower, or pump, the lever 44, when the jack plunger 35 of the jack 41 will be raised. As the jack plunger is elevated, the plate 33 will be swung upwardly about the pivot defined by the pin of the hinge 34. When it is desired to lower the plate 33 to inoperative position or to a position for showing the normal height of a patient's or customer's arch, it is only necessary to release the jack. This may be done by operating the release mechanism 49, which is of conventional construction. The release mechanism is operated by mechanism which includes a handle 50, which is mounted on a stub shaft 51 which projects through the mounting block 48 and through the wall 8. Mounted on the stub shaft 51 is a beveled gear 52 which is adapted to mesh with a beveled pinion 53 which is carried on a vertical operating rod 54. A beveled pinion 55 is carried on the lower end of the rod 54 and is adapted to mesh with a beveled gear 56 which is carried on a horizontal operating shaft 57. The shaft 57 has a universal joint 58 which is connected with the jack and, at its other end, the shaft 57 is journaled by a bearing 59 which is mounted on the bottom wall 15 near the rear wall 8. Rotation of the handle 50 will, as will be understood, be transferred to the mechanism 49 through the rods 54 and 57 and through the gears 52, 53, 55 and 56, for releasing the jack from a raised operative position. The mechanism for releasing the jack 40 is of identical construction to the release mechanism just described so that further description will not be necessary. As stated, the release mechanism hereinabove described is conventional. It should be understood that other mechanism than that shown may be employed for operating the release mechanism if desired. It should also be understood that the jacks 40 and 41 may be raised by electrically or hydraulically operated means, if so desired.

Mounted adjacent each of the jacks 40 and 41 are mirror point switch assemblies 60 and 61, respectively. The switch assembly 61 is typical so that a description of both will not be necessary. The switch assembly 61 is best seen in Figures 4, 5 and 6 of the drawings and includes a bracket 62 which carries a guide frame 63 at its upper end, said guide frame providing means for guiding an operating rack 64 which has its upper end pivotally connected to the link 37. The switch 61 has a rotatable shaft 65 mounted near the upper end of the bracket 62 and said rotatable shaft carries a pinion 66 on its inner end for engagement with the teeth of the rack 64. As best seen in Figures 7 and 10, the switch includes a contact plate 67 having a plurality of contacts 68 thereon, said contacts being engageable by a rotatable contact member 69 which is fixed to rotate with the shaft 65. It will now be understood that, when the jack is raised, the lever 36 will transmit lifting motion through the link 37 to the operating rack 64. The raising of the operating rack 64 will cause rotation of the shaft 65 with the result that the contact member 69 will be rotated for selectively engaging the contacts 68.

The detailed construction of the indicator 24, which is typical, will now be set forth. The indicator 24 is, as stated, in the general shape of the human left foot. As best seen in Figure 9, the indicator 24 includes a base 70 and a translucent cover 71. The arch portion of the indicator is divided into a plurality of compartments 72, in each of which is mounted a bulb 73. The cover 71 is provided with indicia for indicating the number of each of the compartments.

In the cabinet 1 on the bottom 15 thereof is mounted a transformer 74, said transformer having primary wires connected with a source of electric current through a toggle switch 75 which is mounted on the rear wall 8 near the upper end thereof and medially of the width of said wall. The transformer 74 also includes secondary wires which are connected selectively with the switch assemblies 60 and 61, the selected switch 23, and the bulbs 73 in the indicators 24 and 25. In Figure 10 of the drawings, I have shown the wiring diagram and reference will now be had more particularly to that view. One terminal of the secondary transformer 74 is connected, by a conductor 76 to corresponding terminals of all of the bulbs 73 in each of the indicators 24 and 25. The other terminal of the secondary is connected with the switch arm of the selector switch 23. One of the contacts of the switch 23 is connected with the shaft 65 of the assembly 60 and the other contact of the switch 23 is connected with the shaft 65 of the assembly 61. Each of the contacts 68 is connected with one of the remaining terminals of each of the bulbs in the indicator 24. The contacts 68 of the other switch assembly are connected with the remaining terminals of the bulbs 73 in the indicator 25. At 77 is shown a pilot light and this pilot light is connected across the secondary terminals by conductors 79 and 80.

By referring particularly to Figure 1 of the drawings, it will be seen that the plates 32 and 33 are each provided with sockets 81 which receive snaps 82 on which are carried insoles or pads 83. The pads or insoles 83 are thus removably mounted on the plates 32 and 33 and serve the purpose of insulating the foot from the bare surface of the plates and also of biasing arches to a desired degree. That is to say, the insoles or pads 83 may be stuffed so as to provide arch supports or lifts. In view of the provision of the snaps 82, the pads may, as stated, be quickly removed from the plates when desired.

Adjustably mounted on the plate 12 and cooperating with the foot plates 32 and 33 are guides 84 and 85, said guides serving the purpose of retaining the feet in proper position with respect to the plates 32 and 33 so that an accurate measurement of the arches may be assured. The guides are provided with pins 86 which are removably engageable in sockets 87 to permit either longitudinal or lateral adjustment.

The operation of the invention will now be briefly set forth. When it is desired to measure a patient's arches, to determine the amount of correction, if any, necessary for assuring maximum foot health, it is only necessary for the patient or customer to remove his shoes and to place his feet on the foot plates 32 and 33. The operator then determines which foot he will measure first and throws the switch 23 accordingly. Let it be assumed that the operator desires to measure the left foot first. It is only necessary for him to throw the switch for connecting the switch assembly 60 in the circuit with the secondary of the transformer, the switch 75 having been thrown for energizing the transformer windings. The operator then engages his foot with the treadle 46 on the lever 43 and rapidly pumps said lever up and down for raising the jack plunger 35 and, thus, the foot plate 32. As the plunger is raised, the operating rack 64 will be raised for rotating the contact members 69 and progressively connecting the bulbs 73 with the transformer secondary. More specifically, the bulbs are so connected with the switch that the first bulb to be illuminated as operation is begun will be that in the compartment 72 which is nearest the inside of the foot. As the contact member rotates upon continuous raising of the plunger 35, the bulbs in the compartments will be illuminated selectively and progressively inwardly so that, when the plate 32 is in its maximum raised position, the innermost bulb will be illuminated for indicating that the maximum height of the plate has been reached. It should be understood, however, that it will normally not be necessary to raise the plate 32 to its maximum height. The plate is, however, raised to the height at which the arch should be disposed for maximum health. The operator takes notice of this height by observing which of the bulbs in the compartment 72 is illuminated. He then rotates the pointer 29 to indicate, on the scale 28, the number beneath which the illuminated bulb is located. The operator then rotates the handle 50 for releasing the release mechanism and allowing the pressure of the patient's or customer's arch to return the plate to its normal position. As the plunger is pushed down, the contact member will be rotated in the opposite direction for again selectively illuminating certain of the bulbs. For example, the pressure of the patient's or customer's foot may be sufficient to return the plate to such a position that the bulb in the compartment beneath the numeral 4 will be illuminated. The operator will then set the next recorder to 4. He thus has a recording of the height of the arch of the patient's or customer's foot and the height said arch should be in order for said patient or customer to enjoy maximum foot health and comfort. He can then provide shoes with arches so formed to produce the necessary support.

After the arch of the left foot has been measured, in the manner hereinbefore set forth, the operator will turn his attention to the right foot. In order to measure the right foot, the switch 23 is changed and the operation hereinbefore described is repeated by the plate 33 and its associated mechanism.

It is desired particularly to call attention to the fact that, in view of the provision of the sight openings 18 and 21, both the patient and the operator may observe the action of the foot plates during a measuring operation. Thus, the operator can point out to the patient any particular irregularities in his arch structure during the measuring operation. The amount of arch weakness, extension of feet through elongation, adduction or abduction, and pronation may thus be determined, so that proper corrective measures may be instituted.

Attention is particularly directed to the fact that, in view of the particular mounting of the plates 32 and 33, uniform pressure on the arch will be assured as said arch is being raised. Discomfort will thus be avoided.

It is believed that it will be understood that, by the use of my improved foot measuring machine, it will be possible to determine, quickly and accurately, the proper measurements of a patient's or customer's feet so that shoes with proper arch supports may be provided.

It should also be understood that various modifications in the construction hereinbefore set forth may be made without departing from the spirit of the invention or from the scope of the appended claims.

It is believed that the construction and operation of my machine will now be thoroughly understood.

Having thus described the invention, what is claimed as new is:

1. A foot measuring machine including a cabinet having a vertical section and a horizontal section, arch elevating means carried by the horizontal section, electrically operated indicating devices carried by the vertical section and being in the shape of the human feet, and means connected with the arch elevating means and electrically connected with the indicating devices and with a source of electric current for indicating on the indicating devices various positions of the arches during a foot measuring operation.

2. A device of the class described including a machine having a vertical section and a horizontal section, a foot plate carried by the horizontal section, means for elevating the foot plate for raising the arch of a human foot to a normal position, indicating means on the vertical section for indicating the various positions of the arch, said vertical section having a front wall cut away near its lower end, a mirror mounted in the cabinet above the top wall of the horizontal section and beneath the front wall, a sight tunnel mounted on the vertical section, and a sight opening in the vertical section above the sight tunnel, said sight tunnel and mirror permitting observation by a customer of his feet during a foot measuring operation.

3. In a device of the class described, a foot plate, a jack for raising the foot plate for raising an arch of the human foot to a normal position, an electric switch connected with the foot plate, and means connected with the electric switch and with a source of electric current for indicating various positions of the arch, said switch including a bracket, an operating rack, a shaft, a pinion on the shaft and engageable with the operating rack, a plurality of contacts, and a contact member rotatable with the shaft and selectively engageable with the contacts for closing an electric circuit to the indicator.

ANDREW D. A. DEL PESCO.